United States Patent [19]

Carlson

[11] 4,319,653
[45] Mar. 16, 1982

[54] ENGINE ENCLOSURE FOR TRACTOR

[76] Inventor: Richard B. Carlson, 3519 S. 10th St., Fargo, N. Dak. 58103

[21] Appl. No.: 133,401

[22] Filed: Mar. 24, 1980

[51] Int. Cl.³ .............................................. B62D 25/10
[52] U.S. Cl. .................................................. 180/89.17
[58] Field of Search ......................... 180/89.17, 69 R; 296/191, 194, 196, 197, 35.1, 35.3

[56] References Cited

U.S. PATENT DOCUMENTS

| | | | |
|---|---|---|---|
| 2,413,792 | 1/1947 | Sharp | 180/69 R |
| 2,468,809 | 5/1949 | Brock et al. | 180/69 R |
| 2,769,503 | 11/1956 | Wagner | 180/89.17 |
| 2,868,310 | 1/1959 | Lee | 180/89.17 |
| 3,217,354 | 11/1965 | May | 180/89.17 |

Primary Examiner—Richard A. Bertsch
Assistant Examiner—Ross Weaver
Attorney, Agent, or Firm—Kinney, Lange, Braddock, Westman and Fairbairn

[57] ABSTRACT

An engine enclosure for a tractor that includes a first half of an engine hood enclosing one-half of the engine and a second half of a hood enclosing the other half of the engine. A front grill is pivotally connected at the lower front end of the chasis frame and pivots outwardly and downwardly, allowing room for the subsequent pivoting of the first and second halves of the hood. The two hood sections each have a substantially vertical side section and each have a substantially horizontal dependent top section overlying approximately half the engine. The two hood sections are pivotally attached along a substantially vertical axis to the front center of the chasis frame and pivot outwardly and horizontally away from the engine, exposing the engine.

7 Claims, 7 Drawing Figures

U.S. Patent   Mar. 16, 1982   4,319,653
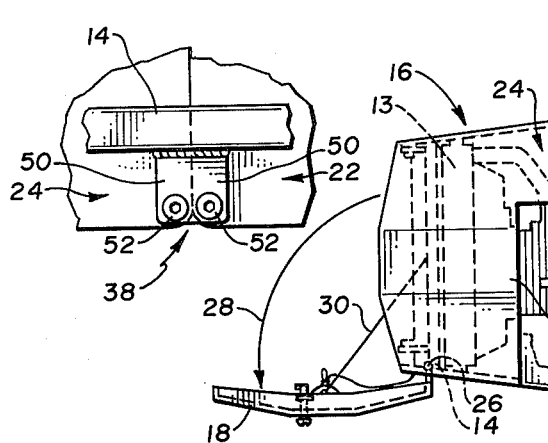
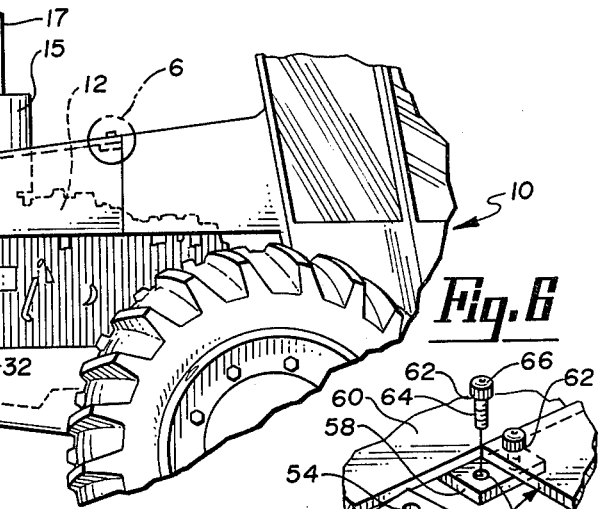
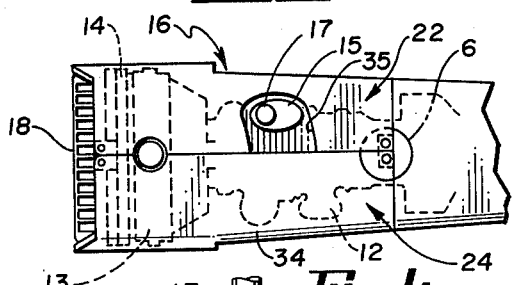
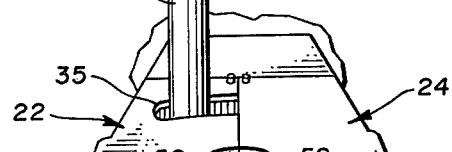
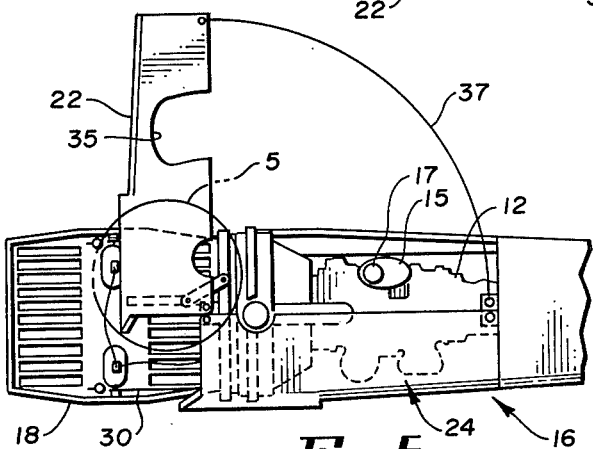
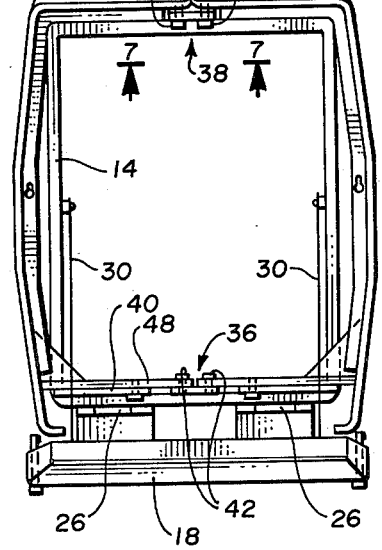
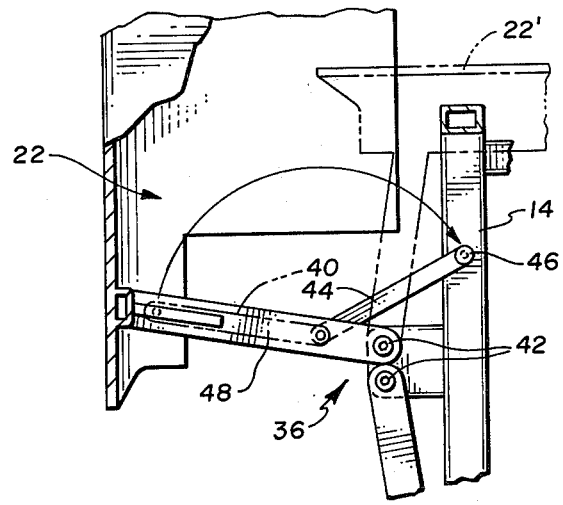

ENGINE ENCLOSURE FOR TRACTOR

BACKGROUND OF THE INVENTION

1. Field of the Invention

The present invention relates to engine enclosures for large tractors and, in particular, the present invention relates to an engine enclosure wherein the enclosure or hood can readily be moved to a position exposing the engine.

2. Description of the Prior Art

Tractors and especially large tractors, have large engines which require large engine enclosures weighing a great deal. The great weight of the engine enclosure poses a problem in removing the enclosure to provide maintenance on the engine in an easy, efficient and safe manner and keeping the enclosure in an open position. One method of the prior art for exposing the engine is to pivotally attach part or all of the engine enclosure to the chassis frame.

The Kesl et al. U.S. Pat. No. 2,883,365 and the Wolfgram U.S. Pat. No. 4,131,172 teach the idea of pivotally attaching a vertical side panel that swings outwardly and horizontally to expose a portion of the engine. These patents provide only a partial solution to the problem since only a selected portion of the engine is exposed, which may not be the portion requiring maintenance.

Further, difficulties arise in handling tools within the enclosure in spite of the side panel opening since there are restricted or obstructed areas within the fixed walls of the enclosure.

The Lee U.S. Pat. Nos. 2,833,364 and 2,868,310 try to provide a further solution in trying to obtain optimum exposure and access to the engine. In the Lee patents, in FIG. 2, the engine enclosure is divided into three start positions, the top hood and first and second horizontally pivoting vertical side walls. The vertical side walls are pivotally attached to the vertical ends of the radiator. The hood is pivotally attached to the frame and pivots upwardly exposing the top of the engine. This type of engine enclosure arrangement poses two problems for large tractors. The weight of the hood of a large tractor requires a great deal of upward force to pivot the hood to its upward position. Secondly, once the hood has been moved to its upward position, it poses a hazard to the maintenance person working on the engine if the mechanisms holding the hood fails and the hood drops downwardly.

The Sharp U.S. Pat. No. 3,413,792 divides the engine enclosure into two halves, each half pivoting about an incline located near the front center of the engine compartment. The grille is also divided into two and is part of each half, as shown in FIGS. 1 and 2 of the patent. This arrangement of the Sharp patent poses the same problems as the Lee patent in that splitting the engine enclosure of a large tractor into two sections results in each section weighing a great deal. The weight of the pivoting half of the engine enclosure requires a great deal of force to pivot the half away from the engine to an upward position due to the pivot being on an incline. Once the enclosure half is in its upward position, the maintenance person working on the engine is exposed to a hazard if the mechanism holding the engine enclosure ever fails. The weight of such an engine enclosure falling down on a person can easily cause serious injury. The Sharp patent further shows another engine enclosure arrangement in FIG. 5 wherein the vertical sides swing out on vertical pivots, the pivots being located on the vertical ends of the grille portion, similar to the Lee patents. This type of arrangement does not provide complete and optimal access to the engine since the top of the engine is apparently still enclosed. The Sharp patent shows still another arrangement in FIGS. 9 and 10 wherein the vertical side walls of the engine enclosure pivot about a vertical pivot point with the grille staying in a fixed position. This arrangement, while suitable for a conventional automobile, would not be suitable for large tractors. Moreover, the grille fixed to the chassis frame provides an obstruction to any maintenance of the front of the engine.

SUMMARY OF THE INVENTION

The engine enclosure of the present invention is designed to provide easy access to any portion of the engine for maintenance or other purposes. The engine enclosure includes an outwardly and downwardly pivoting front grille pivotally connected at the lower front end of the chassis frame. First and second enclosure halves are pivotally connected to the front center of the chassis frame, the pivotal connection lying along a substantially vertical axis. The first and second enclosure halves each have a substantially vertical side wall and a horizontal dependent top section, each top section overlying approximately half the engine. The first and second enclosure halves pivot outwardly and horizontally away from the engine, exposing the engine in its entirety.

The downward pivoting of the front grille allows the first and second enclosure halves to be pivoted to the front of the chassis frame, exposing and making accessible as much of the engine as possible. The substantially horizontal pivoting of the first and second enclosure halves does not require any upward force for pivoting. A minimum amount of force is used to pivot the first and second enclosure halves to their most outwardly pivoted positions. Once in their pivoted positions, the first and second enclosure halves do not pose any hazard to the maintenance person working on the engine since their motion is substantially horizontal.

BRIEF DESCRIPTION OF THE DRAWINGS

FIG. 1 is a partial side view of a tractor having an engine enclosure of the present invention with the front grille in a downward position;

FIG. 2 is a top view of the engine enclosure of the present invention in closed position;

FIG. 3 is a top view of the engine enclosure with the front grille in a downward position and a first enclosure half in an outwardly horizontal pivoted position;

FIG. 4 is a front view of the engine enclosure with the grille in a downward position;

FIG. 5 is a top view of the portion within circle 5 in FIG. 3 with a portion of the enclosure cut away to show the locking link for the first and second enclosure halves in an open position;

FIG. 6 is a perspective view of the portion within circle 6 in FIGS. 1 and 2, showing the means for locking the first and second enclosure halves in a closed position; and FIG. 7 is a view taken along the line 7—7 in FIG. 4 showing the manner in which the first and second enclosure halves are pivotally secured to the supporting bracket.

DETAILED DESCRIPTION OF THE PREFERRED EMBODIMENT

In FIG. 1, tractor 10 is partially shown having an engine 12 mounted to a chassis frame 14. The engine enclosure generally indicated at 16 is shown enclosing and protecting the engine 12 and raditor 13 from the elements. A muffler 15 and exhaust pipe 17 allow exhaust gases to escape from the engine 12.

The engine enclosure 16 of the present invention includes three major parts. A grille 18, as shown in FIG. 1 in a downward horizontal position which protects the front part of the engine 12. A first enclosure half 22 and a second enclosure half 24 protect the engine 12 from the sides and the top, as shown in FIGS. 1 and 2.

The front grille 18 is pivotally attached to the chassis frame 14 by a pivotal connection 26. The grille is normally in an upward vertical position and is pivoted downwardly as indicated by arrow 28. The grille is held in its downward horizontal position and prevented from further downward movement preferably by a catch wire 30 as shown in FIG. 1, the catch wire being secured at its outer end to the grill and at its inner end to a suitable frame member. The pivotal connection 26 between the grille 18 and the chassis frame 14 may be any standard type of pivotal hinge strong enough to support the grille 18.

The first and second enclosure halves 22 and 24 each include a substantially vertical side section 32 as shown in FIG. 1 and a top section 34 as shown in FIG. 2 for the second enclosure half 24. An opening 35 in the top section 34 allows the muffler 15 to protrude through the top section while both enclosure halves are in a closed position. The first enclosure half also has a like vertical side section and top section. The top section of each enclosure half approximately overlies a half of the engine 12.

In FIG. 2, the first and second enclosure halves 22 and 24 are in their closed position, enclosing the engine 12. FIG. 3 shows the first enclosure half 22 in its pivoted or open position, having been pivoted as shown by circular line 37. The first and second enclosure halves 22 and 24 are pivotally attached to the chassis frame along a substantially vertical axis which results in a substantially horizontal pivoting motion. Even though the first and second half enclosures may weigh a great deal, especially on a large tractor, the horizontal pivoting eliminates the need for a large amount of force to pivot the enclosure halves to their outward positions exposing the engine, as was the case in the prior art. Further, once the enclosure halves 22 and 24 are pivoted to their outwardmost position, no safety catch is needed to hold the enclosure halves in their outward positions since they are hinged along a substantially vertical axis.

Bottom pivotal hinges 36 and top pivotal hinges 38 hold the first and second enclosure halves 22, 24 to the chassis frame 14 as shown in FIG. 4. The bottom pivotal hinges are located on either side of a longitudinal center plane of the tractor. Likewise, the top pivotal hinges 38 are also located on either side of the longitudinal center plane of the tractor. The top pivotal hinges 38 are located approximately above the bottom pivotal hinges 36 resulting in a substantially vertical pivoting axis which in turn results in the desirable characteristics described previously above.

The bottom pivotal hinge 36, as best shown in FIG. 5, preferably comprises a bracket member 48 rigidly attached to first enclosure half 22 and pivotally attached to the chassis frame at point 42. A pivotal link member 44 is pivotally attached to the chassis frame 14 at point 46 at one end and slidably engages bracket member 48 along a slot 40 at the other end. As the second enclosure half is pivoted from its closed position, shown in dotted lines as 22' in FIG. 5, to the outwardly open position shown in solid lines in FIG. 5, the link member slides along slot 40 until it reaches the position shown whereby it acts as a stop preventing further pivoting of the first enclosure half beyond a position substantially transverse to the longitudinal plane of the tractor. The second enclosure half 24 is attached to the frame in the same manner as the first enclosure half 22.

The top pivotal hinges 38 each may simply include a rigid member 50 welded to the chassis frame 14 to which each of the first and second half enclosures 22 and 24 is rotably secured by means of a pivot pin 52. Even though the pivotal hinges 36, 38 have been described in detail, any type of pivotal hinge that will result in pivoting along a substantially vertical axis is within the scope of the present invention.

To hold the first and second enclosure halves 22 and 24 in closed position a simple latching device 53 is employed as shown in FIG. 6. The simple latching device 53 includes an aperture 54 in the first enclosure half 22 alignable with an aperture 56 in a rigid member 58 which in turn is fixedly attached to a fixed portion 60 of the tractor 10. A pin 62 with the main body 64 extends through the aligned apertures 64 and 56 thereby locking the first enclosure half 22 in the closed position. The pin has a head 66 which prevents the pin 62 from falling through the aligned apertures 54, 56. The second enclosure half 24 is also locked in a like manner with like elements of the latching device 53. The first and second enclosure halves may be locked in any other manner without departing from the scope of the present invention.

In use, the front grille 18 is first pivoted downwardly. The pivoting of the front grille downwardly has two purposes, the first being the exposure of the radiator 13 in front of the engine for maintenance purposes and second purpose being to provide space for the pivoting of the first or the second enclosure half 22, 24. If the grille were not pivoted downwardly, a complex pivoting hinge would be needed to allow the first or second enclosure halves to pivot around the grille. After the front grille 18 has been pivoted downwardly, either the first or second enclosure half is pivoted horizontally to its outermost position optimally exposing that half of the engine 12 requiring the maintenance.

CONCLUSION

The present invention provides an easy opening engine enclosure especially for large tractors, eliminating the hazard of the enclosure falling down and seriously injuring the person working on the engine by including a downward pivoting front grille and horizontally pivoting first and second enclosure halves. Further, the enclosure system of the present invention provides optimal access to the engine for maintenance or other work.

Although the present invention has been described with reference to the preferred embodiment, persons skilled in the art will recognize that changes may be made in form and detail without departing from the spirit and scope of the invention.

What is claimed is:

1. In combination with a tractor having an engine mounted on a chassis frame, an engine enclosure comprising:
- an outwardly and downwardly pivoting front grille pivotally connected at a lower front end of the chassis frame;
- a first enclosure half pivoting outwardly and horizontally from the engine along a first substantially vertical pivot axis proximate a centerplane of the tractor and behind the grill and having a substantially vertical side section and a substantially horizontal dependent top section overlying approximately half the engine, said first enclosure half being pivotally attached at the front end of the chassis frame proximate one side of the longitudinal tractor center plane; and
- a second enclosure half pivoting outwardly and horizontally from the engine along a second substantially vertical pivot axis proximate the center plane of the tractor and also behind the grill and having a second substantially vertical side section and a second substantially horizontal dependent top section overlying the other half of the engine, said second enclosure half being pivotally attached at the front end of the chassis frame proximate an opposing side to the first enclosure half of the longitudinal tractor center whereby when the front grille is pivoted outwardly and downwardly, either of the enclosure halves may be pivoted outwardly and horizontally to a stable outwardly pivoted position, providing optimal access to the side of the engine covered by the enclosure half.

2. The enclosure of claim 1 further comprising a locking means for locking the first and second enclosure halves in a closed position and preventing any pivotal movement.

3. The enclosure of claim 2 wherein the locking means for the first and second enclosure halves includes a pin means for each enclosure half extending through a first aperture in each enclosure half, said first aperture being aligned with a second aperture located in a non-moving portion of the tractor, said pin means passing through both the first and second apertures in each of the enclosure halves.

4. The enclosure of claim 1 wherein the pivoting front grille has a stop means that limits downward pivotal movement of the horizontal axis.

5. The enclosure of claim 1 wherein the first and second enclosure halves each have a stop means that limits outward horizontal movement to the plane substantially transverse to the longitudinal plane of the tractor.

6. The enclosure of claim 1 in which the front grille is so disposed with respect to the first and second enclosure halves that outward pivoting of either half is prevented when the grill is in its normal vertical position.

7. The enclosure of claim 1 wherein the first and second enclosure halves are each pivotally attached at the front end of the chassis frame with a pair of upper and lower pivot hinges, each pair of the upper and lower pivot hinges being located on substantially the same vertical pivot axis.

* * * * *